Patented July 19, 1949

2,476,360

UNITED STATES PATENT OFFICE 2,476,360

METHOD OF PREPARING PTERIN COMPOUNDS

Leonard Doub, Detroit, and Louis L. Bambas, Grosse Pointe Woods, Mich., assignors to Parke, Davis & Company, Detroit, Mich., a corporation of Michigan No Drawing. Application September 14, 1946, Serial No. 697,158

11 Claims. (Cl. 260—251)

This invention relates to pterin compounds and a process for preparing the same. More particularly, the invention relates to the preparation of 1-(+)-N-[4-([(2-amino-4-hydroxy-6-pteridyl)-methyl]amino)benzoyl] glutamic acid of the formula,

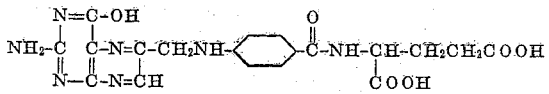

1-(+)-N-[4-([(2-amino-4-hydroxy-6-pteridyl)methyl]amino)benzoyl] glutamic acid is an antianemia factor which can be obtained by hydrolytic or enzymatic degradation of many natural products. In nature, this acid occurs in chemical combination with varying numbers of 1-(+)-glutamic acid residues. For example, the conjugated product obtained from yeast or liver tissue contains six additional 1-(+)-glutamic acid residues while that obtained by fermentation contains an additional two 1-(+)-glutamic acid residues. In the past the free acid has been produced by the autolysis of liver tissue and also by the enzymatic hydrolysis of the conjugated product present in yeast. However, these two methods of obtaining this compound are unsatisfactory from a commercial standpoint because of the small amounts of the conjugated products present in the starting materials and also because of the tedious purification processes which must be employed to obtain material suitable for therapeutic use. Recently two methods of chemical synthesis of this acid have been proposed [see Science, 103, 667-9 (1946)]. The first method consists in reacting equal molar amounts of 2,4,5-triamino-6-hydroxypyrimidine, p-aminobenzoyl-1-(+)-glutamic acid and 2,3-dibromopropionaldehyde in the presence of an acetate buffer. The second method involves reacting 2,3-dibromopropionaldehyde with pyridine and then condensing the resulting product with 2,4,5-triamino-6-hydroxypyrimidine and potassium iodide to obtain N-[(2-amino-4-hydroxy-6-pteridyl)methyl]pyridinium iodide. This pterine compound is then reacted with p-aminobenzoyl-1-(+)-glutamic acid and sodium methoxide in ethylene glycol at 140° C. to produce a material containing the substituted glutamic acid.

We have discovered a method of synthesizing this valuable therapeutic compound which comprises reacting approximately equivalent amounts of an α-halo-acrolein, 1-(+)-p-aminobenzoylglutamic acid and 2,4,5-triamino-6-hydroxypyrimidine at a pH between about 4 and 8.5 in a reaction medium consisting of water or an aqueous water miscible organic solvent such as dioxane, methanol, ethanol, isopropanol and acetone. Although the process can be effected by the simultaneous reaction of the three starting materials, we prefer, from the standpoint of yields, to carry it out in a step-wise fashion. This is accomplished by first condensing the α-halo-acrolein with the p-aminobenzoylglutamic acid and then reacting the resulting product with 2,4,5-triamino-6-hydroxypyrimidine. This latter reaction product which is dihydro-1-(+)-N-[4-([(2-amino-4-hydroxy-6-pteridyl)methyl]amino) benzoyl] glutamic acid may either be simultaneously or subsequently oxidized to the desired 1-(+)-N-[4-([(2-amino-4-hydroxy-6-pteridyl)methyl] amino)benzoyl] glutamic acid.

The transformations which take place in our process probably can be diagrammatically represented as follows:

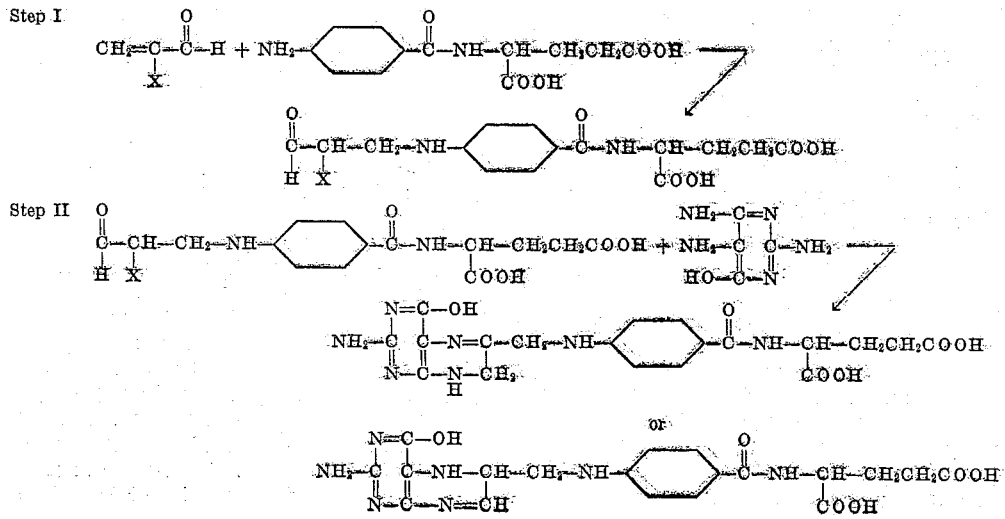

Step III—Product of Step II  Oxidation

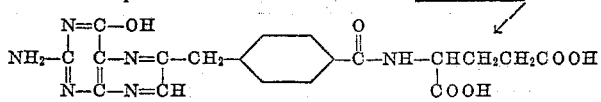

where X is —Cl or —Br.

The pH may be controlled throughout the process by the use of a buffer such as sodium acetate, potassium acetate, sodium bicarbonate, disodium hydrogen phosphate and the like. Alternatively, the pH of the initial reaction mixture may be adjusted to a value between 4 and 8.5 and, if necessary, readjusted at the start of the second step of the process. In general, it is not necessary to readjust the pH of the mixture before carrying out the oxidation step of the process as the yields are about the same whether the oxidation is carried out simultaneously with the second step or subsequently as a separate and third step in the process.

The first step of the process which appears to involve the 1,4-addition of the 1-(+)-p-aminobenzoyl-glutamic acid to the α-halo-acrolein is preferably carried out in aqueous dioxane under slightly acidic conditions, e. g., at a pH between about 4 and 5, and at a temperature below about 50° C. Under these conditions the condensation proceeds quite rapidly to produce a high yield of the intermediate condensation product. This condensation product which probably is a 1-(+)-p - (β - halo - β - formylethyl) aminobenzoylglutamic acid of the formula,

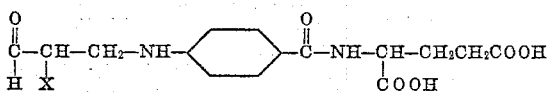

where X has the same significance as given above, is not isolated but is used without further purification in the next step of the process.

The cyclization or second step of the process is preferably carried out under acidic conditions but at a slightly higher pH than that used in Step I. The pH of the reaction mixture during this step of the process has a great influence on the color and yield of the final product. At a pH between about 4 and 5 the reaction product contains a dark reddish-brown colored impurity which makes it more difficult to purify the final oxidation product. However, we have found that the formation of this impurity can be eliminated to a large extent by carrying this reaction out at a pH slightly less than 7 but greater than about 5.5. The yellow colored dihydropterin compound which is produced under these latter conditions yields on oxidation a light colored and readily purifiable final product.

The exact location of the two hydrogen atoms in the dihydropterin compound is not known with certainty but it appears as if they are located either in the 5-6 ond 7-8 positions. However, since both of these dihydro-pterins, or a mixture of the two, yield the desired pterin compound on oxidation the exact structure of this intermediate product does not influence the yield of the final product. Moreover, this intermediate dihydropterin product is not isolated but is converted by oxidation directly to the desired pterin compound. This oxidation can be carried out at the same time as the cyclization step by vigorous stirring or aeration of the reaction mixture. The temperature during this simultaneous cyclization and oxidation is kept below about 50° C., preferably at about room temperature, and the pH of the reaction mixture maintained within the limits set forth above. In general, this combination reaction requires about fifteen to twenty-five hours for completion due to the slow rate of the cyclization step.

Alternatively, the cyclization step of the process may be carried out in an inert atmosphere such as nitrogen or methane and then the dihydropterin product present in the reaction mixture oxidized to the corresponding pterin. This two-step reaction is effected in the following manner: An equivalent amount of solid 2,4,5-triamino-6-hydroxypyrimidine or a solution of the same is added to the reaction mixture obtained from Step I of the process and the resultant mixture stirred or agitated in the absence of air for about ten to fifteen hours. The reaction mixture containing the dihydro-pterin is then aerated with oxygen or air for about four to six hours to convert the dihydro-pterin to the desired pterin compound. The pH and temperature during both of these steps are maintained within the same limits as when carrying out this transformation by simultaneous cyclization and oxidation.

The invention is illustrated by the following examples.

*Example 1*

2.66 g. of p-aminobenzoyl-1(+)-glutamic acid and 2 g. of sodium acetate are dissolved in 100 cc. of warm water and the solution cooled to room temperature. 1.35 g. of α-bromo-acrolein (Ber. 31, 1385(1898)) is added to the p-aminobenzoyl-1(+)-glutamic acid solution with vigorous shaking and the mixture allowed to stand for twenty minutes. At the end of this time the pH of the solution was about 4.5. A solution of 1.4 g. of 2,4,5-triamino-6-hydroxypyrimidine in 200 cc. of water is prepared in a separate container and then added with vigorous stirring to the solution containing the crude addition product of α-bromo-acrolein and p-aminobenzoyl-1(+)-glutamic acid. A fine chocolate colored precipitate starts to separate out of the acidic reaction mixture (pH about 4) soon after mixing. The mixture is stirred overnight, the pH adjusted to 3 by the addition of dilute hydrochloric acid and the brownish colored precipitate collected by filtration. After drying in vacuo at room temperature the crude product weighs 2.65 g. It contains 12% by weight of the desired 1-(+)-N-[4-([(2-amino-4 - hydroxy - 6 - pteridyl)methyl]amino)benzoyl]glutamic acid as shown by microbiological assay.

After standing for about two days a second crop of the crude product separates from the reaction mixture filtrate. It is collected and dried as before. This material which weighs 0.5 g. contains 18.7% of the desired product.

The total yield of the crude product is 3.15 g. while the percentage yield of pure product based on the amount of starting materials used is 9.3%.

The purification of the crude product can be effected in the following manner. The crude material is dissolved in 0.2 N sodium hydroxide (c. a. 7.5 liters) and about 315 g. solid barium chloride added to the solution. 2.5 liters of ethanol is added and the precipitate which separates collected and discarded. The solution is freed of barium by precipitation as the sulfate and the filtrate from this procedure diluted to 30 liters. The pH is adjusted to 7 and the precipitate which separates collected and discarded. The filtrate is extracted three times with 10 volume portions of butanol and the butanol extracts discarded. The aqueous phase is concentrated in vacuo to 7.5 liters, the pH adjusted to 3 and cooled to 0 to 5° C. The precipitate which separates is collected, dissolved in 0.1 N sodium hydroxide (c. a. 3.5 liters), charcoaled and filtered. The filtrate is adjusted to pH 3, the desired product collected and crystallized from hot water.

The pure 1-(+)-N-[4-([(2-amino-4-hydroxy-6-pteridyl)methyl]amino)benzoyl] glutamic acid gradually darkens with charring and without melting on heating. Depending on the rate of heating, decomposition sets in, as evidenced by darkening of color, at around 250° C. and a gradual charring as the temperature is raised to 360° C. Its ultra violet absorption spectrum in 0.005 N sodium hydroxide exhibits three absorption maxima very close to the wave lengths 256 mu, 282 mu and 365 mu, with $$E^{1\%}_{1cm.}$$

of approximately 542, 531 and 194 respectively, and absorption minima very close to the wave lengths 235 mu, 268 mu and 333 mu, with $$E^{1\%}_{1cm.}$$

of approximately 299, 476 and 135 respectively. Decreasing the pH of the solution decreases the extinction at the maxima at wave lengths 256 mu and 365 mu and increases the extinction at 282 mu.

This pure acid is yellowish orange in color and crystallizes in the form of clusters of microcrystals which show birefringence between crossed Nicol prisms. It is relatively insoluble in cold water and most organic solvents with the exception of pyridine or glacial acetic acid. Its solubility in cold water is about 0.01 mg. per cc. while in hot water it is about 1 mg. per cc. It is more soluble in cold dilute methanol (0.15 mg. per cc.) than in water but it is quite insoluble in anhydrous n-butanol (less than 0.005 mg. per cc.).

The product exercises a growth-stimulating effect on Lactobacillus casei and an antianemia vitamin effect in chicks suffering from a deficiency of this acid. In human therapy it is useful in treatment of non-pernicious anemias.

*Example 2*

2 g. of sodium acetate and 2.66 g. of p-aminobenzoyl-1(+)-glutamic acid are dissolved in 300 cc. of distilled water while blanketing the solution with nitrogen. Nitrogen is bubbled through the solution and 1.4 g. of α-bromoacrolein is added with stirring. The mixture is stirred for ten minutes and the resultant solution added to a solution of 1.55 g. of 2,4,5-triamino-6-hydroxypyrimidine in 200 cc. of water. During this addition and the subsequent reaction the mixture is covered with an atmosphere of nitrogen. A heavy chocolate colored precipitate separates from the solution soon after mixing the two reactants. The reaction vessel is stoppered and shaken for forty-eight hours. The reaction mixture is removed from the reaction vessel and aerated for four hours by blowing air through the solution to oxidize the dihydro 1-(+)-N-[4-([(2-amino-4-hydroxy - 6 - pteridyl(methyl]amino)benzoyl] glutamic acid. At the end of the aeration the pH of the solution is about 5. The precipitate of the crude product is collected, washed with cold water and dried in vacuo at room temperature. The weight of the crude product is 2.7 g. which contains 11.1% of the desired 1-(+)-N-[4-([(2-amino - 4 - hydroxy-6-pteridyl)methyl]amino) - benzoyl] glutamic acid as shown by microbiological assay on *Lactobacillus casei*.

If the pure material is desired it may be obtained from this crude product by the purification method described in Example 1.

*Example 3*

0.266 g. of p-aminobenzoyl-1(+)-glutamic acid is dissolved in 10 cc. of warm 50% aqueous dioxane, the solution cooled and neutralized to pH 7 with 1 N sodium hydroxide solution. 0.14 g. of α-bromo-acrolein in 1.5 cc. of dioxane is added with vigorous shaking, the mixture allowed to stand for 10 minutes and then diluted to a volume of 20 cc. with 50% aqueous dioxane. This diluted solution is added with stirring to a solution of 0.15 g. of 2,4,5-triamino-6-hydroxypyrimidine in 20 cc. of water, the reaction vessel stoppered and shaken overnight. The reaction vessel is opened and the mixture aerated for three hours by bubbling air through the solution. The pH of the solution which at this time is 4.8 is adjusted to 3.5 and the mixture diluted to 100 cc. with distilled water. The brown colored crude product is collected, washed with cold water and dried in vacuo at room temperature. The weight of this material which contains 13.3% (microbiological assay) of 1-(+)-N-[4-([(2-amino-4-hydroxy - 6 - pteridyl)methyl]amino)benzoyl] glutamic acid is 0.17 g. If desired, the crude product may be purified as described in Example 1.

*Example 4*

1.35 g. of α-bromo-acrolein is added to 2.66 g. of p-amino-benzoyl-1(+)-glutamic acid dissolved in 30 cc. of dilute methanol at 24° C. The temperature of the reaction mixture rises 4° C. and a yellow color develops immediately. After the mixture has stood for five or six minutes 3 g. of sodium acetate is added and the solution covered with methane. After standing for one hour 1.4 g. of 2,4,5-triamino-6-hydroxypyrimidine in 500 cc. of 50% methanol is added and the mixture allowed to stand under methane overnight. The reaction mixture is aerated for three hours by bubbling air through the solution and the crude product collected by filtration and dried. The crude material weighs 1 g. and contains 8.5% (by microbiological assay) of pure 1-(+)-N-[4-([(2-amino-4-hydroxy-6-pteridyl)methyl]amino)benzoyl] glutamic acid. The pure acid may be obtained from this crude material by following the purification procedure described in Example 1.

*Example 5*

2.66 g. of p-aminobenzoyl-1(+)-glutamic acid is dissolved in 10 ml. of 50% aqueous dioxane and the pH of the solution adjusted to 7.5 by the addition of 1 N sodium hydroxide solution. 0.9 g. of α-chloro-acrolein in a small amount of dioxane is added and the mixture stirred for one and a half hours. The pH of the solution is again adjusted to 6.5 and then added to a solution of 0.15 g. of 2,4,5-triamino-6-hydroxypyrimidine in 20 cc. of water. The reaction mixture is stirred over night, the pH adjusted to 3.5 and the crude brown colored product collected. After drying the product weighs about 1 g. and contains about 10% (by microbiological assay) of pure 1-(+)-N-[4-([(2-amino - 4 - hydroxy - 6 - pteridyl)methyl]-amino)benzoyl] glutamic acid. The pure acid may be obtained from the crude material by the purification procedure of Example 1.

What we claim as our invention is:

1. Process for obtaining 1-(+)-N-[4-([(2-amino - 4 - hydroxy-6-pteridyl)-methyl]amino)-benzoyl] glutamic acid of formula,

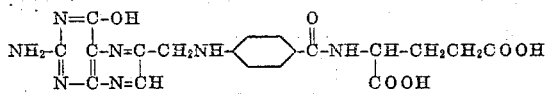

which comprises reacting an α-halo-acrolein of the class consisting of α-chloro and α-bromo acrolein, p-amino-benzoyl 1-(+)-glutamic acid and 2,4,5-triamino-6-hydroxy pyrimidine below about 50° C. at a pH between about 4 and 8.5 in a reaction medium of the class consisting of water and aqueous water-miscible organic solvents and oxidizing the dihydro-1-(+)-N-[4-([2 - amino - 4 - hydroxy - 6 - pteridyl)methyl]-amino)benzoyl] glutamic acid so formed with gaseous oxygen, thereby obtaining 1-(+)-[4-([(2 - amino - 4 - hydroxy-6-pteridyl)-methyl]-amino)benzoyl] glutamic acid.

2. Process for obtaining (1-(+)-N-[4-([(2-amino - 4 - hydroxy-6-pteridyl)methyl]amino)-benzoyl] glutamic acid of formula,

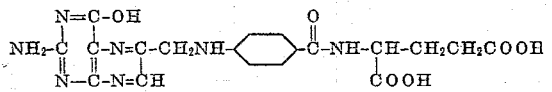

which comprises condensing an α-halo-acrolein of the class consisting of α-chloro and α-bromo-acrolein with p-aminobenzoyl-1(+)-glutamic acid, reacting the condensation product with 2,4,5-triamino-6-hydroxy-pyrimidine and oxidizing the dihydro-1-(+)-N-[4-([(2-amino-4-hydroxy - 6 - pteridyl)methyl]amino)benzoyl] glutamic acid so formed with gaseous oxygen, thereby obtaining 1-(+)-[4-([(2-amino-4-hydroxy-6-pteridyl)-methyl]amino)benzoyl] glutamic acid, said process being carried out in a reaction medium of the class consisting of water and aqueous water miscible organic solvents at a pH between about 4 and 8.5 and at a temperature below about 50° C.

3. Process for obtaining (1-(+)-N-[4-([(2-amino - 4 - hydroxy-6-pteridyl)methyl]amino)-benzoyl] glutamic acid of formula,

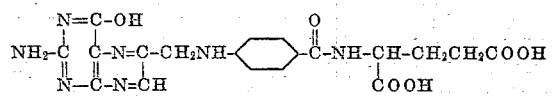

which comprises condensing α-bromo-acrolein with p-aminobenzoyl-1-(+)-glutamic acid, reacting the condensation product with 2,4,5-tri-amino-6-hydroxypyrimidine and oxidizing the dihydro - 1 - (+) - N-[4-([(2-amino-4-hydroxy-6-pteridyl)methyl]amino)benzoyl] glutamic acid so formed with gaseous oxygen, thereby obtaining 1 - (+) - [4-([(2-amino-4-hydroxy-6-pteridyl)-methyl]amino)benzoyl] glutamic acid, said process being carried out in a reaction medium of the class consisting of water and aqueous water miscible organic solvents at a pH between about 4 and 8.5 and at a temperature below about 50° C.

4. Process for obtaining (1-(+)-N-[4-([(2-amino - 4 - hydroxy-6-pteridyl)methyl]amino)-benzoyl] glutamic acid of formula,

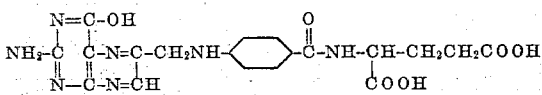

which comprises condensing an α-halo-acrolein of the class consisting of α-chloro and α-bromo-acrolein with p-aminobenzoyl - 1(+) - glutamic acid at a pH between about 4 and 5, reacting the condensation product with 2,4,5-triamino-6-hydroxypyrimidine at a pH slightly less than 7 but greater than about 5.5 and oxidizing the dihydro-1-(+)-N-[4-([(2-amino-4-hydroxy-6-pteridyl)-methyl]amino)benzoyl] glutamic acid so formed with gaseous oxygen, thereby obtaining 1-(+)-[4 - ([(2-amino-4-hydroxy-6-pteridyl)-methyl]-amino)benzoyl] glutamic acid, said process being carried out in a reaction medium of the class consisting of water and aqueous water-miscible organic solvents at a temperature below about 50° C.

5. Process for obtaining (1-(+)-N-[4-([(2-amino - 4 - hydroxy-6-pteridyl)methyl]amino)-benzoyl] glutamic acid of formula,

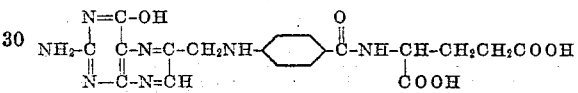

which comprises condensing an α-halo-acrolein of the class consisting of α-chloro- and α-bromo-acrolein with p-aminobenzoyl - 1(+)-glutamic acid at a pH between about 4 and 5, reacting the condensation product with 2,4,5-triamino-6-hydroxypyrimidine at a pH slightly less than 7 but greater than about 5.5 and simultaneously oxidizing the dihydro-1-(+)-N-[4-([(2-amino-4-hydroxy - 6 - pteridyl)methyl]amino)benzoyl] glutamic acid so formed with gaseous oxygen, thereby obtaining 1-(+)-[4-([(2-amino-4-hydroxy-6-pteridyl)-methyl]amino)benzoyl] glutamic acid, said process being carried out in a reaction medium of the class consisting of water and aqueous water-miscible organic solvents at a temperature below about 50° C.

6. Process for obtaining (1-(+)-N-[4-([(2-amino - 4 - hydroxy-6-pteridyl)methyl]amino)-benzoyl] glutamic acid of formula,

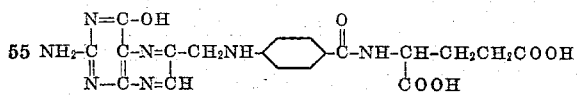

which comprises condensing an α-halo-acrolein of the class consisting of α-chloro- and α-bromo-acrolein with p-aminobenzoyl-1(+)-glutamic acid at a pH between about 4 and 5, reacting the condensation product with 2,4,5-triamino-6-hydroxypyrimidine in an inert atmosphere at a pH slightly less than 7 but greater than about 5.5 and subsequently oxidizing the dihydro-1-(+)-N-[4-([(2-amino-4-hydroxy-6-pteridyl)methyl]-amino)benzoyl] glutamic acid so formed with gaseous oxygen, thereby obtaining 1-(+)-[4-([(2 - amino - 4 - hydroxy - 6-pteridyl)methyl]-amino)benzoyl] glutamic acid, said process being carried out in a reaction medium of the class consisting of water and aqueous water-miscible organic solvents at a temperature below about 50° C.

7. In a process for obtaining 1-(+)-N-[4-([(2- amino - 4 - hydroxy-6-pteridyl)methyl]amino)-benzoyl] glutamic acid of formula,

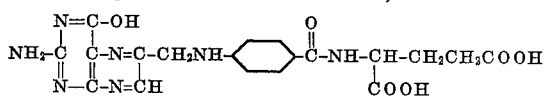

the step which comprises condensing an α-haloacrolein of the class consisting of α-chloro- and α-bromo-acrolein with p-aminobenzoyl-1-(+)-glutamic acid in a reaction medium of the class consisting of water and aqueous water-miscible organic solvents at a pH between about 4 and 8.5 and at a temperature below about 50° C. to obtain a 1-(+)-p-(β-halo-β-formylethyl)aminobenzoyl glutamic acid of probable formula,

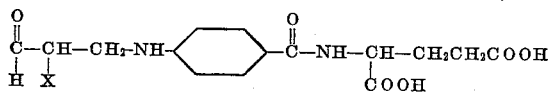

where X is a member of the class consisting of —Cl and —Br.

8. In a process for obtaining 1-(+)-N-[4-([(2-amino - 4 - hydroxy-6-pteridyl)methyl]amino)-benzoyl] glutamic acid of formula,

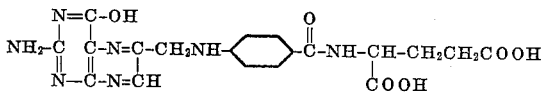

the step which comprises condensing an α-haloacrolein of the class consisting of α-chloro- and α-bromo-acrolein with p-aminobenzoyl-1-(+)-glutamic acid in aqueous dioxane at a pH between about 4 and 5 and at a temperature below about 50° C. to obtain a 1-(+)-p-(β-halo-β-formylethyl)aminobenzoyl glutamic acid of probable formula,

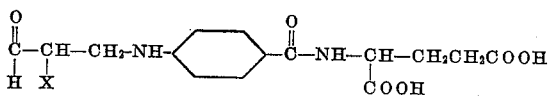

where X is a member of the class consisting of —Cl and —Br.

9. In a process for obtaining 1-(+)-N-[4-([(2-amino - 4 - hydroxy-6-pteridyl)methyl]amino)-benzoyl] glutamic acid of formula,

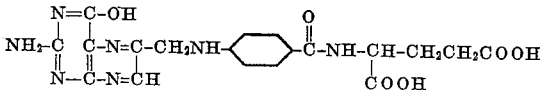

the steps which comprise reacting a 1-(+)-p-(β - halo - β-formylethyl)aminobenzoylglutamic acid of the class consisting of the β-chloro- and β-bromo-derivatives of said acid which has the probable formula,

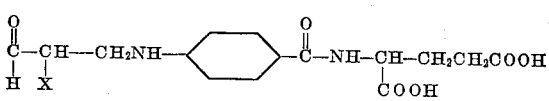

where X is a member of the class consisting of —Cl and —Br, with 2,4,5-triamino-6-hydroxypyrimidine and oxidizing the dihydro-1-(+)-N-[4-([(2 - amino - 4 - hydroxy - 6-pteridyl)methyl]-amino)benzoyl] glutamic acid so formed with gaseous oxygen, thereby obtaining 1-(+)-[4-([(2 - amino - 4 - hydroxy - 6-pteridyl)methyl]-amino)benzoyl] glutamic acid, said steps being carried out in a reaction medium of the class consisting of water and aqueous water-miscible organic solvents at a pH between about 4 and 8.5 and at a temperature below about 50° C.

10. In a process for obtaining 1-(+)-N-[4-([(2 - amino-4-hydroxy-6-pteridyl)methyl]amino)benzoyl] glutamic acid of formula,

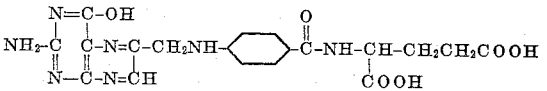

the steps which comprise reacting a 1-(+)-p-(β - halo - β-formylethyl)aminobenzoylglutamic acid of the class consisting of the β-chloro- and β-bromo-derivatives of said acid which has the probable formula,

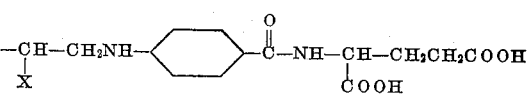

where X is a member of the class consisting of —Cl and —Br, with 2,4,5-triamino-6-hydroxypyrimidine at a pH slightly less than 7 but greater than about 5.5 and simultaneously oxidizing the dihydro - 1-(+)-N-[4-([(2-amino-4-hydroxy-6-pteridyl)methyl]amino)benzoyl] glutamic acid so formed with gaseous oxygen, thereby obtaining 1 - (+) - [4-([(2-amino-4-hydroxy-6-pteridyl)methyl]amino)benzoyl] glutamic acid, said steps being carried out in a reaction medium of the class consisting of water and aqueous water-miscible organic solvents at a temperature below about 50° C.

11. In a process for obtaining 1-(+)-N-[4-([(2 - amino-4-hydroxy-6-pteridyl)methyl]amino)benzoyl] glutamic acid of formula,

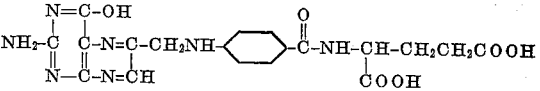

the steps which comprise reacting a 1-(+)-p-(β - halo - β-formylethyl)aminobenzoylglutamic acid of the class consisting of the β-chloro- and β-bromo-derivatives of said acid which has the probable formula,

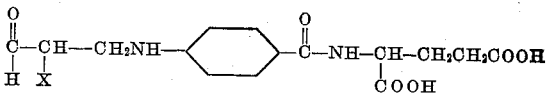

where X is a member of the class consisting of —Cl and —Br, with 2,4,5-triamino-6-hydroxypyrimidine in an inert atmosphere at a pH slightly less than 7 but greater than about 5.5 and subsequently oxidizing the dihydro-1-(+)-N-[4-([(2-amino-4-hydroxy-6-pteridyl)methyl]-amino)benzoyl] glutamic acid so formed with gaseous oxygen, thereby obtaining 1-(+)-[4-([(2 - amino - 4 - hydroxy - 6-pteridyl)methyl]-amino)benzoyl] glutamic acid, said steps being carried out in a reaction medium of the class consisting of water and aqueous water-miscible organic solvents at a temperature below about 50° C.

LEONARD DOUB.
LOUIS L. BAMBAS.

No references cited.